(12) United States Patent
Scipioni et al.

(10) Patent No.: US 9,686,258 B2
(45) Date of Patent: *Jun. 20, 2017

(54) COMPUTER SYSTEM AUTHENTICATION USING SECURITY INDICATOR

(71) Applicant: eBay Inc., San Jose, CA (US)

(72) Inventors: German Scipioni, San Jose, CA (US); Avery Kadison, Cupertino, CA (US); Naseem Hakim, Palo Alto, CA (US)

(73) Assignee: eBay Inc., San Jose, CA (US)

( * ) Notice: Subject to any disclaimer, the term of this patent is extended or adjusted under 35 U.S.C. 154(b) by 361 days.

This patent is subject to a terminal disclaimer.

(21) Appl. No.: 14/180,186

(22) Filed: Feb. 13, 2014

(65) Prior Publication Data

US 2014/0165174 A1   Jun. 12, 2014

Related U.S. Application Data

(63) Continuation of application No. 11/471,904, filed on Jun. 21, 2006, now Pat. No. 8,656,160.

(51) Int. Cl.
*G06F 7/04* (2006.01)
*H04L 29/06* (2006.01)
(Continued)

(52) U.S. Cl.
CPC .............. *H04L 63/08* (2013.01); *G06F 21/31* (2013.01); *G06F 21/44* (2013.01); *G06F 2221/031* (2013.01)

(58) Field of Classification Search
CPC ..... H04L 63/08; H04L 63/123; H04L 9/3281; G06F 21/31; G06F 21/6218
See application file for complete search history.

(56) References Cited

U.S. PATENT DOCUMENTS 6,807,577 B1 * 10/2004 Gillespie ............. H04L 63/0823
709/203
7,430,758 B2 * 9/2008 Toutonghi ............... G06F 21/31
713/182
(Continued)

FOREIGN PATENT DOCUMENTS

WO   WO-2007149483 A2   12/2007
WO   WO-2007149483 A3   12/2007

OTHER PUBLICATIONS

"U.S. Appl. No. 11/183,272, Non-Final Office Action mailed Jan. 23, 2009", 13 pgs.
(Continued)

*Primary Examiner* — Ali Abyaneh
(74) *Attorney, Agent, or Firm* — Schwegman, Lundberg & Woessner, P.A.

(57) ABSTRACT

A method to authenticate a first computer system over a network to a second computer system is disclosed. A login user interface (UI) is presented to a user of the first computer system while disconnected from the second computer system. The login UI presents at least one input field to receive login input from the user and a security indicator that has been previously selected by the user and that is local to the first computer system. Login input is selectively received from the user based on a determination that the user recognizes the security indicator as having been previously selected by the user. A connection is established between the first computer system and the second computer system over the network. The received user input is transmitted using the established connection to the second computer system for authentication of the first computer system.

18 Claims, 5 Drawing Sheets

(51) Int. Cl.
*G06F 21/31* (2013.01)
*G06F 21/44* (2013.01)

(56) References Cited

U.S. PATENT DOCUMENTS

| | | | |
|---|---|---|---|
| 8,656,160 B2 | 2/2014 | Scipioni et al. | |
| 2002/0062451 A1* | 5/2002 | Scheidt | G06F 21/31 726/7 |
| 2004/0148229 A1* | 7/2004 | Maxwell | G06Q 30/0277 705/14.73 |
| 2005/0080898 A1* | 4/2005 | Block | G06F 17/30867 709/225 |
| 2006/0075465 A1 | 4/2006 | Ramanathan et al. | |
| 2006/0106761 A1* | 5/2006 | Sarangam | H04L 41/0681 |
| 2007/0300292 A1 | 12/2007 | Scipioni et al. | |

OTHER PUBLICATIONS

"U.S. Appl. No. 11/471,904, Advisory Action mailed Nov. 2, 2009", 5 pgs.
"U.S. Appl. No. 11/471,904, Appeal Brief filed Feb. 11, 2010", 34 pgs.
"U.S. Appl. No. 11/471,904, Appeal Decision mailed Jun. 27, 2013", 10 pgs.
"U.S. Appl. No. 11/471,904, Decision on Pre-Appeal Brief Request mailed Jan. 14, 2010", 2 pgs.
"U.S. Appl. No. 11/471,904, Examiner's Answer to Appeal Brief mailed May 11, 2010", 17 pgs.
"U.S. Appl. No. 11/471,904, Final Office Action mailed Aug. 6, 2009", 14 pgs.
"U.S. Appl. No. 11/471,904, Notice of Allowance mailed Oct. 7, 2013", 14 pgs.
"U.S. Appl. No. 11/471,904, Pre-Appeal Brief Request mailed Nov. 6, 2009", 5 pgs.
"U.S. Appl. No. 11/471,904, Response filed Apr. 21, 2009 to Non Final Office Action mailed Jan. 23 2009", 16 pgs.
"U.S. Appl. No. 11/471,904, Response filed Oct. 6, 2009 to Final Office Action mailed Aug. 6, 2009", 16 pgs.
"International Application Serial No. PCT/US2007/014377, International Preliminary Report on Patentability mailed Jan. 8, 2009", 7 pgs.
"International Application Serial No. PCT/US2007/014377, Search Report mailed Jul. 28, 2008", p. 220.
"International Application Serial No. PCT/US2007/014377, Written Opinion mailed Jul. 28, 2008", p. 237.

\* cited by examiner

COMPUTER SYSTEM AUTHENTICATION USING SECURITY INDICATOR

PRIORITY

This application is a continuation of U.S. patent application Ser. No. 11/471,904, filed on Jun. 21, 2006, which is incorporated herein by reference in its entirety.

TECHNICAL FIELD

The present application relates generally to computer system authentication. Example embodiments are directed to a system, method and machine-readable medium to authenticate a computer system using a security indicator local to the computer system.

BACKGROUND

In many web applications, particularly in the online banking, credit, shopping and auction applications, it is desirable to have a user log in using a unique login name and a password to authenticate the user before authorizing the user to access certain web pages on the web server. While there are many web-based authentication techniques being implemented, they all have security weaknesses or vulnerabilities.

The vulnerabilities have been exploited via a number of different attacks through which hackers have tried to obtain the user name and password and/or other personal information of the user in order to gain access to these websites, including spoofing, phishing and fraudulent web sites. One particular attack to which web-based authentication has been subjected is called the man-in-the-middle attack in which the attacker is able to read, insert and modify the messages between the client and the server without either knowing that the link between them has been compromised.

It will of course be appreciated that computer system authentication and security are concerns across software applications more generally, whether they are deployed in a standalone capacity, a client/server capacity or a peer-to-peer capacity.

BRIEF DESCRIPTION OF THE DRAWINGS

Some embodiments are illustrated by way of example and not limitation in the figures of the accompanying drawings in which.

DETAILED DESCRIPTION

An example system, method and machine-readable medium for computer system authentication are described. In the following description, for the purposes of explanation, numerous specific details are set forth in order to provide a thorough understanding of example embodiments. It will be evident, however, to one skilled in the art that an example embodiment may be practiced without these specific details.

Example embodiments described herein include a system, method and machine-readable medium for authentication using a security indicator that is local to a first computer system (e.g., client) and not available to a second computer system (e.g., web server) to which the first computer system is being authenticated.

Figure 1:
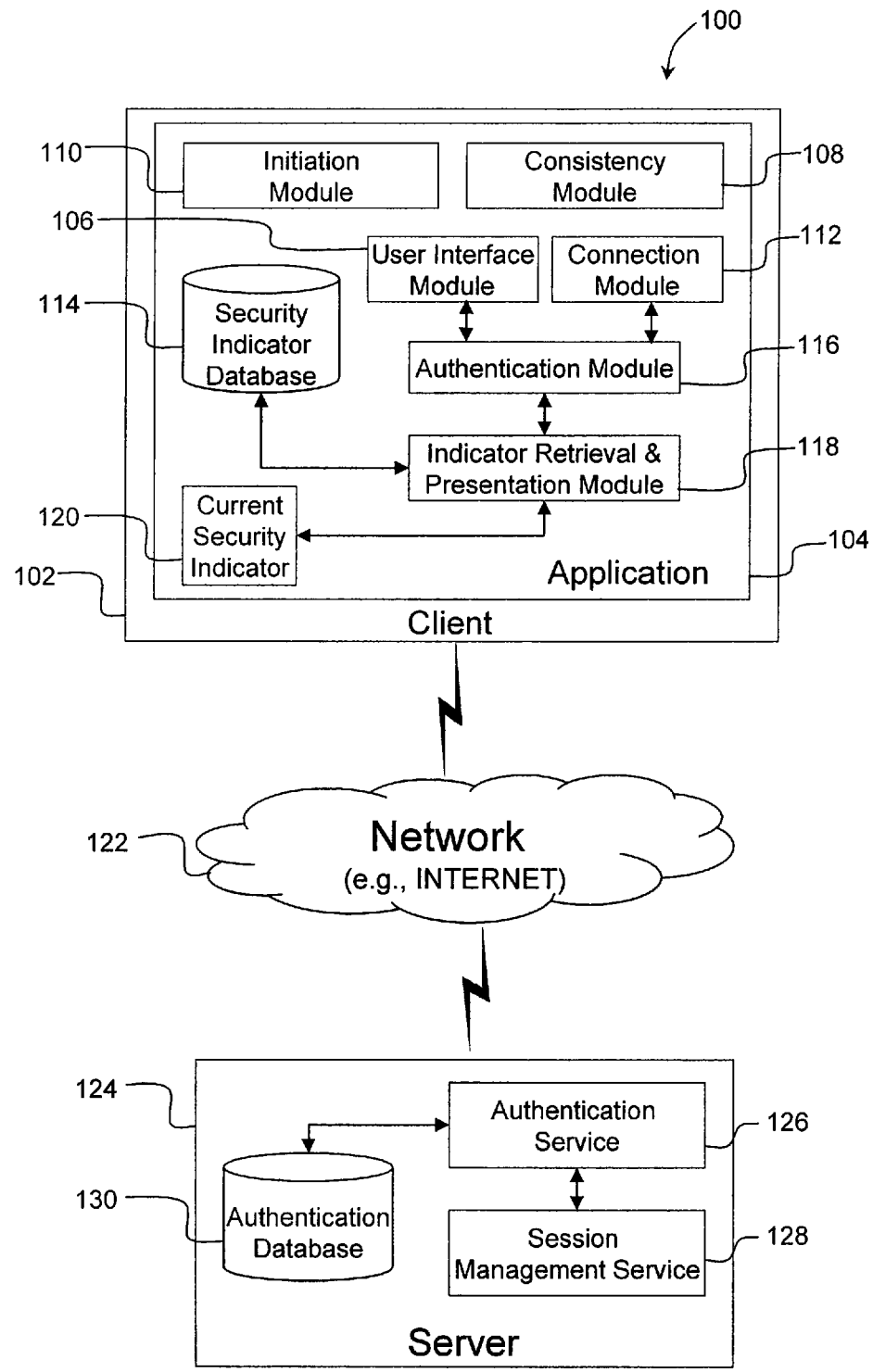
FIG. 1 is an example high-level block diagram of a system for client authentication using a security indicator local to the client and unknown to the server to which the client is being authenticated, in accordance with the present invention.

FIG. 1 is an example high-level block diagram of a system 100 for authentication using a security indicator that is local to a client 102 and unknown to a server 120 to which the client 102 is being authenticated, in accordance with an example embodiment. The client 102 includes an application 104. The application 104 includes a user interface module 106, a consistency module 108, an initiation module 110, an authentication module 116, a security indicator database 114, an indicator retrieval and presentation module 118, and a current security indicator 120. The server 124 includes an authentication service 126 to authenticate the client 102 during login to the server 124 over network 122, a session management service 128 for maintaining a session between the client 102 and the server 124 without requesting the user login for each requested web page or resource from server 124, and an authentication database 130 for maintaining data associated with the client authentication in accordance with the example embodiment. Although the system 100 is described in example fashion in relation to a client/server architecture, it will of course be appreciated that the system 100 may easily be carried out in a peer-to-peer architecture in which each of the client 102 and the server 120, respectively, is a peer machine or a computer system with at least the functionality described herein in relation to the client 102 and server 120, respectively. The client 102 and the server 124 are interconnected over the network 122. The network 122 may be any conventional network, including the Internet, Wide Area Network (WAN), Metropolitan Area Network (MAN), Campus Area Network (CAN), Local Area Network (LAN), Home Area Network (HAN), wireless (802.11), satellite, as well as a variety of different combinations thereof. The communication over the network between the client 102 and the server 124 may be accomplished via a variety of different protocols, including transfer control protocol/Internet protocol (TCP/IP) and hyper text transfer protocol (HTTP), as well as other well known protocols.

Further with reference to FIG. 1, the example application 104 may be a client-based application to provide secure access to web-based services (e.g., online banking, credit, shopping and auction services), in contrast to a completely web-implemented application. It will of course be appreciated that the application may also be a peer-based application in the peer-to-peer architecture described above. It should be understood that the application 104 may incorporate a web browser or call web browser functionality via one or more application protocol interfaces (APIs), or other conventional techniques. The application 104 may be downloaded from server 124 and installed on the client 102.

Alternative sources for installation are also possible, such as, installing the application from a compact disk or any other storage device connected or connectable to the client 102. It is noted that a copy of the application 104 downloaded to the client 102 or installed on the client 102 via other means is stored in the authentication database 130 for later authentication as will be elucidated with reference to FIG. 3.

Yet further with reference to FIG. 1, the application 104 has one or more checksums of the application 104 encoded into or stored in the application 104. The one or more checksums provide for consistency or tamper-resistance of the application 104 and are checked or validated at the instantiation or execution of the application 104. More specifically, a checksum may be encoded into the application 104 that was obtained by applying a hashing algorithm (e.g., SHA-512) to the application 104 as a whole. Alternatively or in addition to this checksum, a checksum (e.g., SHA-512) taken at each of a number of predetermined locations in the application 104 may be encoded into the application 104. It is to be noted that any number of conventional or specifically designed algorithms may be employed to facilitate the checksum functionality described above, for example, HAVAL, MD2, MD4, MD5, RIPEMD-160, TIGER, TIGER2, WHIRLPOOL, or any other cryptographic hashing algorithms, including algorithms in the SHA family.

Figure 5:
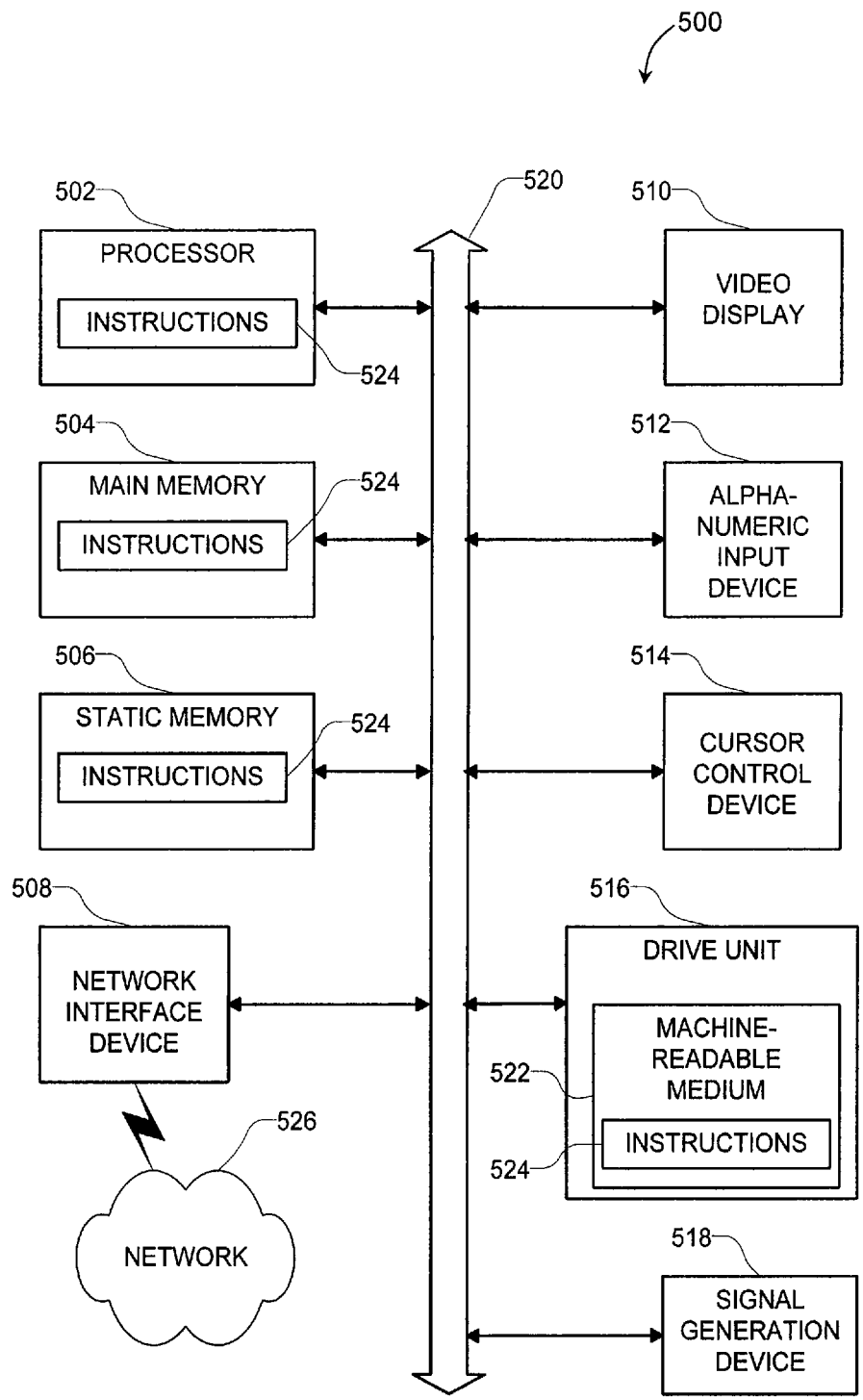
FIG. 5 is a block diagram illustrating an example computer system within which a set of instructions, for causing the computer system to perform any one or more of the methodologies disclosed in FIGS. 1-4, may be executed.

Still further with reference to FIG. 1, during the installation of the application 104, a security indicator database 114 is populated with multiple predetermined security indicators (not shown) transmitted from the server 124, or read from compact disk or other storage device from which the application is installed, for selection by the user. The security indicators may include one or more of the following: images, themes (visual effects), words/phrases, shapes, colors, sounds or skins A security indicator selected by the user will be used in connection with the authentication, as will be elucidated in greater detail below. The indicator retrieval and presentation module 118 retrieves security indicators from the security indicator database 114 and presents the security indicators to the user on a video display or via speaker (FIG. 5). The user may select a security indicator from the presented indicators and the indicator retrieval and presentation module 118 stores the selected security indicator as the current security indicator 120 for the application 104. Alternatively, the user may select the user's own security indicator (e.g., stored in a file), which is then stored as the current security indicator 120 instead of one of the indicators provided. The user may update the current security indicator 120 at a later point in time. It is to be noted that the selected security indicator is not transmitted to the server 124 and always remains local to the client 102. In other words, in the example embodiment, the current security indicator 120 is not communicated over the network 122 and is unknown to the server 124. Therefore, the current security indicator 120 cannot be intercepted and the possibility of the man-in the-middle attack is mitigated.

Finally with reference to FIG. 1, upon completion of the installation, initiation module 110 provides for execution or instantiation of the application 104, either automatically or manually by the user for setting up a user account with the server 124. At this time and at any time the application 104 is instantiated, a consistency module 108 performs a consistency check on the application 104 to verify that there has been no tampering with the application 104. This can be accomplished via a variety of mechanisms. In an embodiment, the consistency module 108 takes a current checksum of the application 104 as a whole and/or checksums at multiple predetermined locations of the application 104 using the hashing algorithm that was used to generate the checksum(s) encoded into the application 104. The current checksum(s) are validated against or compared to the encoded checksum(s). If the checksum(s) are not valid, the initiation module instructs the application 104 to terminate or exit and the user may be notified that the application 104 is being closed and how to remedy this issue. Alternatively, if the current checksum(s) are valid, the application 104 continues by setting up a user account with the server 124. Thereafter, the application 104 automatically launches the authentication module 116, which calls or invokes (e.g., via APIs) connection module 112 to establish a secure connection to the authentication service 126 over network 122. The connection module 112 may utilize conventional techniques, such as secure hyper text transfer protocol (e.g., HTTPS), as well as, any other protocol providing a secure connection using secure sockets layer (SSL), or any other cryptographic protocol enabling a secure connection, such as, transport layer security (TLS), to establish a connection to the authentication service 126. The authentication service 126 transmits via the secure connection one or more web pages (not shown), or other authentication data request, to the authentication module 116 to obtain from the user a unique username and password, as well as other pertinent information establishing identity of the user (e.g., security question), for subsequent logins into the authentication service 126. Thereafter, the authentication service 126 establishes an account for the user with the unique username and password selected by the user. The account information, including the username and password, are stored in the authentication database 130 for later retrieval and authentication.

Figure 2:
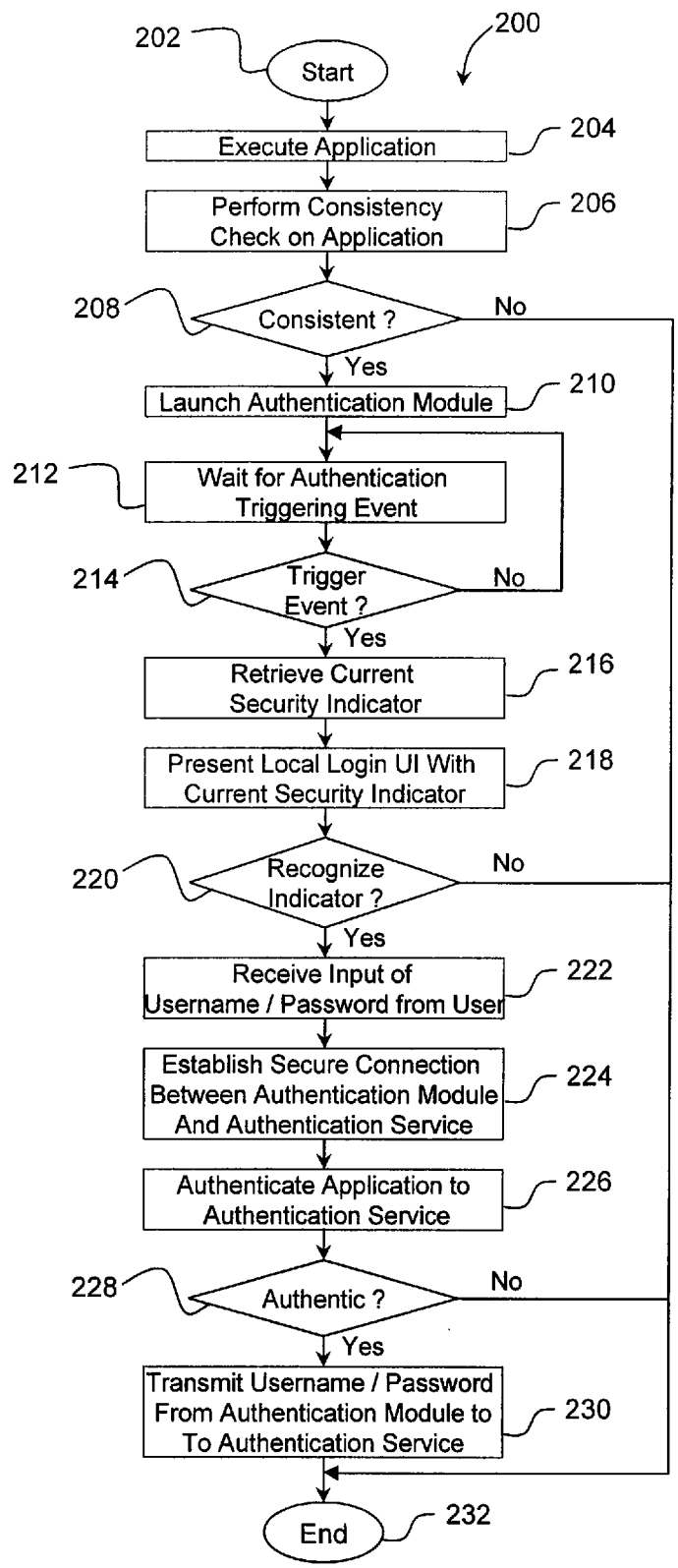
FIG. 2 is flowchart illustrating an example method for client authentication when the client logs into the server illustrated in FIG. 1.

FIG. 2 is a flowchart illustrating an example method 200 for client authentication when the client 102 logs into the server 124 illustrated in FIG. 1. The method 200 starts at operation 202. At operation 204, the application 104 is executed via initiation module 110 that receives an external action. This can be accomplished using a variety of methods, such as for example, the user manually executing the application 104, or the application being automatically executed upon the start up the of the client 102 (e.g., web browser), as well as any other conventional methods that execute the application 104 either manually or automatically. In an example embodiment, the user points and clicks on a desktop/toolbar icon associated with the application 104 or selects the application 104 from a program list and the initiation module 110 initiates execution of the application 104. At this point, the program is executed or instantiated. Alternate instantiation or execution mechanisms are also possible.

Further with reference to FIG. 2, at operation 206, the consistency module 108 of the instantiated application 104 performs an application consistency check on the application 104 to verify that there has not been any tempering with the application 104. As already described above in reference to FIG. 1, the consistency module 108 generates a checksum (or checksums) of the application 104 compares the generated checksum(s) to a checksum(s) of the application encoded into or stored in the application 104. At operation 208, the consistency module 108 determines whether the consistency check produced a consistent or valid result. If the result is inconsistent (e.g., checksum(s) is not valid), the method 200 ends at operation 232, e.g., the consistency module 108 informs the application 104 to terminate or exit. At this point, the user may be notified that the application 104 is being closed due to an invalid consistency check and the user may further be provided with the necessary information as to how to resolve this issue (e.g., instructions to update or reinstall the application 104 or to contact a customer support center). However, if it is determined that the result of the consistency check is valid at operation 208, the method 200 continues at operation 210 where the application 104 launches or executes the authentication module 116.

Still further with reference to FIG. 2, at operation 212, the authentication module 116 waits for an authentication triggering event requiring the user to login. The authentication triggering event that may be received by the authentication module 116 may include any of the following: the authentication module 116 automatically detects one or more input fields on a web-page that require authentication to fill the input fields (e.g., payment data filled on a payment web page); the user manually logs in using the authentication module 116 via a selection to login from a menu or the like; and the authentication module 116 automatically detects the execution or instantiation of an application such as a web browser. If it is determined that a triggering event has occurred at operation 214, the authentication module 116 calls or invokes the indicator retrieval and presentation module 118 to retrieve or read the current security indicator 120, and at operation 218 calls or invokes user interface module 106 (passing the retrieved current security indicator) to present a local login user interface (FIG. 4) with the current security indicator, e.g., while being disconnected from the server 124. The user interface module 106 may implement the local login user interface via a variety of mechanisms, and in an embodiment it may implement the local login user interface as a web page having the input fields, OK/Cancel buttons and the current security indicator. In an alternative embodiment, the user interface module 106 may implement the local login user interface as a user interface call to the application 104 (e.g., call to user interface class). It is noted that in the server-disconnected state, the server 124 does not know and has no access to the current security indicator 120 and hence an attacker that provides a false login webpage from another server will not know the current security indicator, and more importantly, as the current security indicator 116 in not transmitted through the network 122, there is no way for an attacker to trace or view the current security indicator 120 using another server. That is, if there is a security attack, the attacker does not know and cannot trace or intercept the current security indicator 120. More particularly, as the man-in-the-middle attack would be effective in tracing or intercepting a security indicator transmitted over the network 122 and unbeknownst to the user passing correct information from the client 102 to the server 124 while keeping a copy of the information for later fraudulent use, such an attack may be thwarted effectively via the use of the current security indicator 116 in accordance with an example embodiment.

Figure 3:
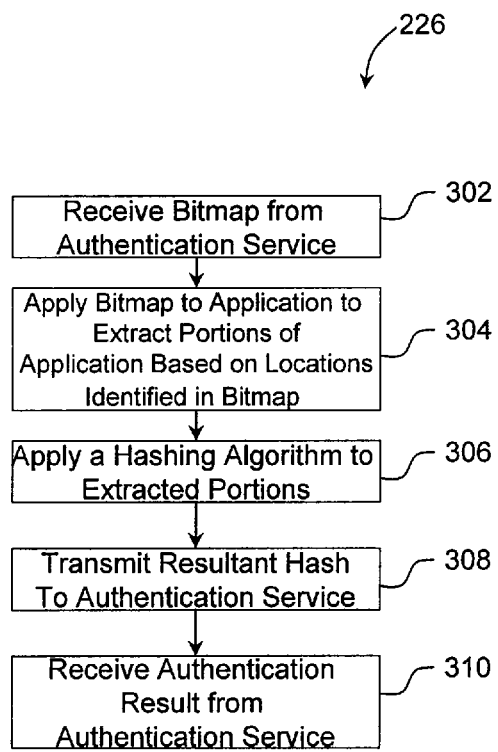
FIG. 3 is a flowchart illustrating an example drilled down method to authenticate an application to the authentication service illustrated in FIG. 2.
Figure 4:
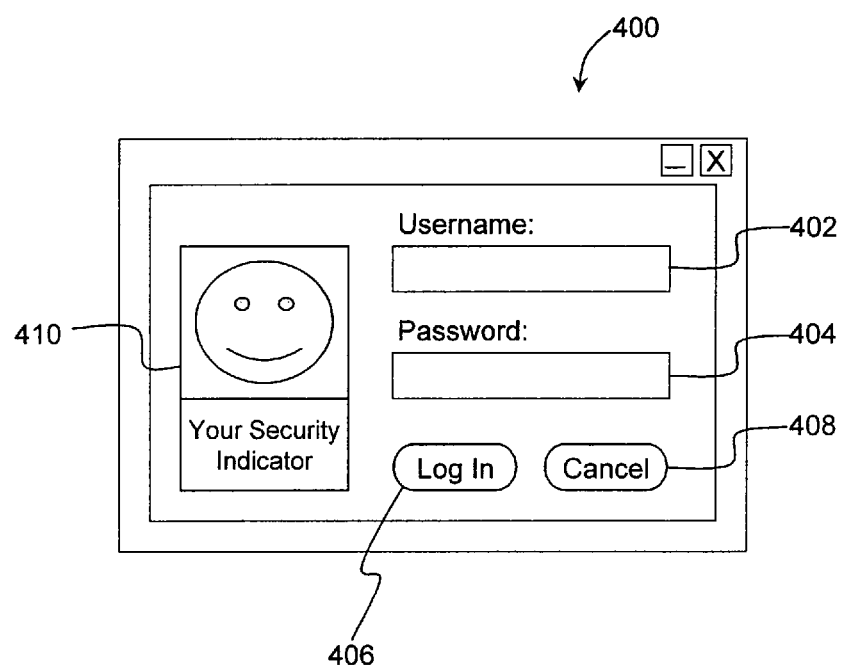
FIG. 4 is an interface diagram illustrating an example local login user interface presenting a security indicator local to the client and unknown to the server to which the client is being authenticated.

Additionally with reference to FIG. 2, at operation 220, the user determines whether the user recognizes the current security indicator 120 presented in the local login user interface (FIG. 4). If the user determines that an improper security indicator is presented or that no security indicator is presented, the user exits the user interface and the method 200 continues at operation 232. At this point, the user may contact customer support to initiate an investigation. If, however, the user determines that the security indicator displayed is the proper security indicator (e.g., current security indicator 120), the method 200 continues at operation 222 where the authentication module 116 via user interface module 106 receives user input of the username and password for the user's account previously set up during installation of the application 104. In an alternative embodiment in reference to operations 216-222, the authentication module 116 may call or invoke user interface module 106 (without the current security indicator) to present a local login user interface (FIG. 4). The authentication module 116 via user interface module 106 may then receive user's username and password, which may be temporarily cached by the authentication module 116. Thereafter, the authentication module 116 via user interface module 106 may present the current security indicator to the user (with or without the received username and password) via a local user interface, querying the user whether the user recognizes the current security indicator 120 presented. The authentication module 116 via user interface module 106 may then receive the user's response to the query. If the user does not recognize the current security indicator, the user may exit the local user interface and the method 200 continues at operation 232. However, if the user recognizes the security indicator, the method 200 continues at operation 224. At operation 224, the connection module 112 establishes a secure connection to the authentication service 126 via network 122. Such a connection may be set up using a secure hyper text transfer protocol (HTTPS), as well as, any other protocol providing a secure connection using secure sockets layer (SSL), or any other cryptographic protocol enabling a secure connection, such as, transport layer security (TLS). Thereafter, at operation 226, the authentication module 116 authenticates the application 104 to the authentication service 126 via the secure connection over network 122, as described with reference to FIG. 3 below.

FIG. 3 is a flowchart illustrating an example drilled down method for the authentication operation 226 of FIG. 2. Now with reference to FIG. 3, at operation 302, the authentication module 116 receives a bitmap from the authentication service 126. The bits of the bitmap identify locations in the application 104. At operation 304, the authentication module 116 applies the bitmap to the application 104, extracting portions of the application 104 based on the locations in the bitmap. At operation 306, the authentication module 116 applies a hashing algorithm to the extracted portions, producing a resultant hash. In an embodiment, an SHA-512 hashing algorithm may be used. Other hashing algorithms described above in reference to FIG. 1 are also possible. The bitmap and the extracted portions of the resultant hash may be stored during processing by the authentication module 116 in memory (FIG. 5). Thereafter, the authentication module 116 transmits the resultant hash to the authentication service 126. Although not shown, the authentication service 126 determines whether the transmitted resultant hash is valid in comparison to a hash the authentication service 126 generated using the same locations using the same hashing algorithm (e.g., SHA-512) in its copy of the application 104. The authentication service 126 may store the copy of the application, the bitmap and its hash in the authentication database 130. If the authentication service 126 receives multiple false authentication attempts, the authentication service 126 may restrict access to the user's account for a predetermined period of time and the account may be flagged for contacting the user regarding potentially fraudulent activity. Thereafter, the authentication service 126 transmits an authentication result, which may include an access restriction, to the authentication module 116. The authentication module 116 receives this authentication result from the authentication service 126 at operation 310 and the method 200 continues at operation 228 in FIG. 2.

Now further with reference to FIG. 2, at operation 228 the authentication module 116 determines whether the authentication result transmitted by the authentication service 126 indicates that the application 104 was determined by the authentication service 126 to be authentic. If the application 104 is not authentic, the flowchart 200 ends at operation 232. At this point, the user may be notified that the application 104 is being closed due to an invalid authentication and/or restricted based on invalid authentication attempts, and the user may further be provided with the necessary information as to how to resolve this issue (e.g., instructions to update or reinstall the application 104). If the application is not authentic, the user may not be given authority to conduct any business with the server 124. If at operation 228, the application 104 is determined to be authentic, the flowchart 200 continues at operation 230 where the authentication module 116 transmits the username and password received from the user at operation 222 to the authentication service 126 for authentication of the user and logging the client 102 into the server 124. Although not shown, the authentication service 126 compares the transmitted username and password to those stored in the authentication database 130 and logs client 102 into the server 124 if there is a match. If no matching username and/or password is found, the authentication service 126 transmits a negative authentication result to the authentication module 116 for display to the user, notifying the user that the client 102 could not be logged into the server 124. The user may presented with a login error message in the local login user interface (another window or application) and then requested to re-enter the username and password. The re-entered username and password are re-transmitted at operation 230. If the authentication service 126 receives multiple failed authentication attempts, the authentication service 126 may restrict access to the user's account for a predetermined period of time, notifying the user that the client 102 is restricted from logging into the server 124, and the account may be flagged for contacting the user regarding this suspicious activity.

FIG. 4 is an example local login user interface (UI) 400 that presents a current security indicator 410 local to the client 102 and unknown to the server 124 to which the client 102 is being authenticated. The presented security indicator 410 is read from the current security indicator 116 in FIG. 1. The user interface 400 includes input fields 402, 404 for receiving the username and password, respectively. The user interface 400 further includes buttons 406, 408 for login and cancel buttons, respectively. If the current security indicator 410 chosen by the user is not presented to the user within the UI 400 or if no security indicator is presented within the UI 400, the user may cancel out of the user UI 400, preventing possible security attackers from obtaining personal information. It is to be reiterated that the UI may be generated locally at the client 102, without connection to the server 124 and without transmission of the current security indicator 410 over network 122. Consequently, the local UI 400 and current security indicator 410 obviate the deficiencies of web-based authentication, and more particularly, mitigate the possibility of the man-in the-middle attack as described herein.

FIG. 5 is a diagrammatic representation of machine in an example form of a computer system 500 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Further with respect to FIG. 5, the example computer system 500 includes a processor 502 (e.g., a central processing unit (CPU), a graphics processing unit (GPU) or both), a main memory 504 and a static memory 506, which communicate with each other via a bus 520. The computer system 500 may further include a video display unit 510 (e.g., a liquid crystal display (LCD) or a cathode ray tube (CRT)). The computer system 500 also includes an alphanumeric input device 512 (e.g., a keyboard), a user interface (UI) navigation device 514 (e.g., a mouse), a disk drive unit 516, a signal generation device 518 (e.g., a speaker) and a network interface device 508.

Still further with reference to FIG. 5, the disk drive unit 516 includes a machine-readable medium 522 on which is stored one or more sets of instructions and data structures (e.g., software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media. The software 524 may further be transmitted or received over a network 526 via the network interface device 508 utilizing any one of a number of well-known transfer protocols (e.g., HTTP).

Lastly with reference to FIG. 5, while the machine-readable medium 522 is shown in the example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of an example embodiment, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Thus, a method, system and machine-readable medium for computer system authentication using a security indicator have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method, comprising:
   upon receiving an action initiated at a first computer system presenting, from the first computer system, a login user interface (UI) to a user of the first computer system while disconnected from and not in communication with a second computer system, the login UI presenting at least one input field to receive login input from the user and a security indicator that has been previously selected by the user and that is local to the first computer system, the security indicator being unknown to and not accessible by the second computer system; and
   based on a determination that the user recognizes the security indicator as having been previously selected by the user,
      selectively receiving the login input from the user at the first computer system;
      establishing a connection between the first computer system and the second computer system over a network;
      transmitting the received user login input using the established connection to the second computer system;
      receiving, at the first computer system, an authentication bitmap from the second computer system identifying locations in an application,
      extracting portions of the application based on the identified locations in the bitmap, at the first computer system;
      applying a hashing algorithm to the extracted portions at the first computer system, producing a resultant hash; and
      transmitting the resultant hash to the second computer system to authenticate the application.

2. The method of claim 1, further comprising maintaining the security indicator as being local to the first computer system and unknown to the second computer system.

3. The method of claim 1, wherein the transmitting of the received user login input is for authenticating the first computer system to the second computer system.

4. The method of claim 1, further comprising:
   authenticating the first computer to the second computer system;
   upon authentication of the first computer system to the second computer system, executing the application over the network with the second computer system; and
   based on a determination that the user recognizes the security indicator as having been previously selected by the user, authenticating the application to the second computer system.

5. The method of claim 4, further comprising performing a consistency check on the application to make a determination whether tampering has occurred with the application.

6. The method of claim 5, wherein the consistency check comprises performing a checksum of an entirety of the application.

7. The method of claim 5, wherein the consistency check comprises performing a plurality of checksums at multiple predetermined locations of the application.

8. The method of claim 5, further comprising:
   based on a determination that the consistency check indicates that tampering has occurred with application, terminating the application; and
   instructing the user how to remedy the termination of the application.

9. The method of claim 5, further comprising:
   based on a determination that the consistency check indicates that no tampering has occurred with the application, establishing a secure connection between the first computer system and the second computer system; and
   transmitting, via the secure connection, an authentication data request for a unique username and password from the user.

10. The method of claim 9, wherein the authentication data request comprises one or more web pages transmitted via the secure connection.

11. The method of claim 1, further comprising, based on a determination that the user does not recognize the security indicator as having been previously selected by the user, preventing security attackers from obtaining personal information by not transmitting the security indicator over the network.

12. A method of authenticating a client, the method comprising:
   upon receiving an external action at the client, executing an application;
   performing a consistency check on the application by the client;
   making a determination, at the client, as to whether a result of the consistency check is valid;
   based on a determination that the result of the consistency check is valid, launching the application at the client;
   receiving, at the client, an authentication triggering event requiring the client to provide a client log-in via a local login user interface while being disconnected from a remote server;
   based on receiving a valid version of the client log-in at the remote server,
   establishing a secure connection with the remote server upon receiving the log-in input from the client; and
   authenticating the application to the remote server, the authentication including:
      receiving at the client an authentication bitmap from the remote server, with at least portions of the bitmap representing locations in the application;
      applying the received bitmap to the application to extract the represented locations from the application;

hashing the extracted locations to form a resultant hash, and transmitting the resultant hash to the remote server to authenticate the application.

13. The method of claim 12, wherein the client log-in further comprises payment data from the client to access the application.

14. The method of claim 12, further comprising:

based on a determination that the client does not recognize the current security indicator, terminating the application; and instructing a user at the client how to remedy the termination of the application.

15. The method of claim 12, further comprising upon receiving the log-in input from the client, validating the log-in input.

16. The method of claim 15, wherein validation of the log-in input is performed by comparing the log-in input with a predetermined log-in received from the client.

17. A tangible machine-readable storage device having no transitory components and including instructions executable by one or more processors to perform operations to authenticate a first computer system over a network to a second computer system, the operations comprising:

upon receiving an action initiated at a first computer system, presenting, from the first computer system, a login user interface (UI) to a user of the first computer system while disconnected from and not in communication with a second computer system, the login UI presenting at least one input field to receive login input from the user and a security indicator that has been previously selected by the user and that is local to the first computer system, the security indicator being unknown to and not accessible by the second computer system; and based on a determination that the user recognizes the security indicator as having been previously selected by the user, selectively receiving the login input from the user at the first computer system;

establishing a connection between the first computer system and the second computer system over a network; and transmitting the received user login input using the established connection to the second computer system;

receiving, at the first computer system, an authentication bitmap from the second computer system identifying locations in an application, extracting portions of the application based on the identified locations in the bitmap, at the first computer system;

applying a hashing algorithm to the extracted portions at the first computer system, producing a resultant hash; and transmitting the resultant hash to the second computer system to authenticate the application.

18. The tangible machine-readable storage device of claim 17, further comprising, based on a determination that the user does not recognize the security indicator as having been previously selected by the user, preventing security attackers from obtaining personal information by not transmitting the security indicator over the network.

* * * * *